United States Patent [19]
Schlichenmaier et al.

[11] Patent Number: 5,272,018
[45] Date of Patent: Dec. 21, 1993

[54] ELECTROCHEMICAL STORAGE DEVICE

[75] Inventors: Peter Schlichenmaier, Fellbach; Wilfried Weyer, Stuttgart; Heinz-Georg Burghoff, Reichenbach, all of Fed. Rep. of Germany

[73] Assignee: Mercedes-Benz AG

[21] Appl. No.: 871,126

[22] Filed: Apr. 20, 1992

[30] Foreign Application Priority Data

Apr. 20, 1991 [DE] Fed. Rep. of Germany ....... 4113006

[51] Int. Cl.⁵ .......................................... H01M 10/52
[52] U.S. Cl. .......................................... 429/57; 429/90
[58] Field of Search ................... 429/57, 53, 54, 90, 429/61

[56] References Cited

U.S. PATENT DOCUMENTS

| | | | |
|---|---|---|---|
| 2,862,641 | 12/1958 | Philipp | 429/57 X |
| 3,470,024 | 9/1969 | George et al. | 429/57 |
| 3,787,243 | 1/1974 | Zaleski | 429/56 |
| 4,403,019 | 9/1983 | Poe | 429/53 |
| 4,751,154 | 6/1988 | Binder et al. | 429/53 |
| 4,751,155 | 6/1988 | Binder et al. | 429/53 |

FOREIGN PATENT DOCUMENTS

| | | |
|---|---|---|
| 0304568 | 3/1989 | European Pat. Off. |
| 2552809 | 5/1977 | Fed. Rep. of Germany |
| 8019159 | 10/1980 | Fed. Rep. of Germany |
| 58-71565 | 4/1983 | Japan |
| 59-149650 | 8/1984 | Japan |
| 2-37663 | 2/1990 | Japan |
| 978426 | 12/1964 | United Kingdom |
| 1141507 | 1/1969 | United Kingdom |

Primary Examiner—Anthony Skapars
Attorney, Agent, or Firm—Evenson, McKeown, Edwards & Lenahan

[57] ABSTRACT

An electrochemical storage device comprises an electrolyte which forms an ignitable gas under certain conditions during use. The electrochemical storage device is constituted by a tank and a lid which is joined in a liquid-tight manner thereto and in which the terminal pillars are brought out at the top. Furthermore, it has a labyrinth-type pressure equalization connection built into the lid to connect to atmosphere the space situated above the electrolyte and enclosed by the housing. A separate, shape-adapted displacement body having an hermetically closed cavity is disposed in the space between the lid and the electrolyte surface so that the housing does not burst in the event of an ignition of the gas.

10 Claims, 1 Drawing Sheet

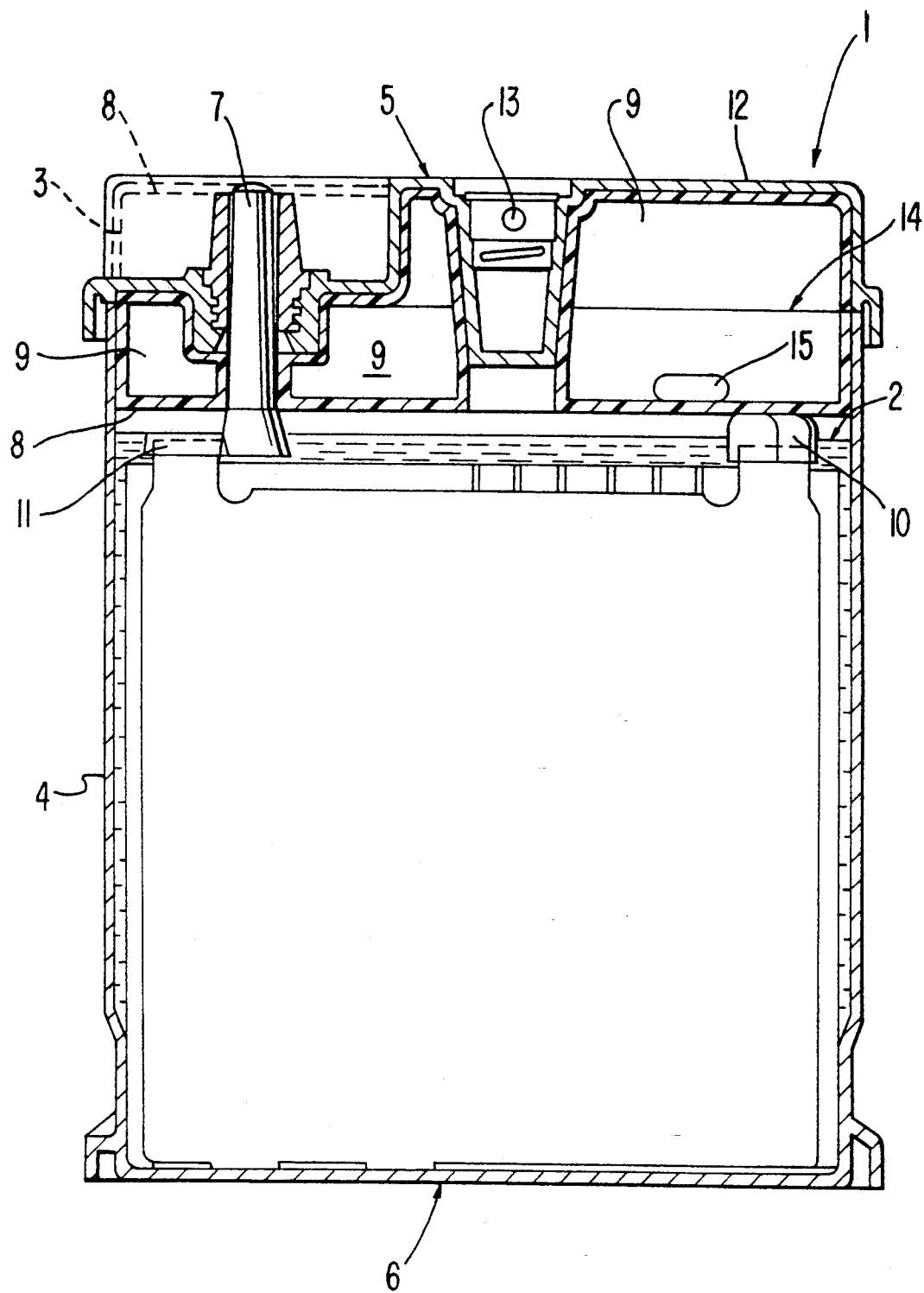

ELECTROCHEMICAL STORAGE DEVICE

BACKGROUND AND SUMMARY OF THE INVENTION

The present invention relates to an electrochemical storage device with an electrolyte which forms an ignitable gas and having a housing formed from a tank and a lid joined in a liquid-tight manner to the tank and in which the terminal pillars are passed in a sealed manner through the lid of the housing at the top.

German Utility Model 80 19 159 discloses a storage battery in boxed construction. The housing of the battery is formed from a tank and a lid joined to it in a liquid-tight manner. The terminal pillars are brought out at the top through the lid of the housing in a sealed manner. Incorporated in the lid is a labyrinth-type pressure equalization connection which connects the space situated above the electrolyte and surrounded by the housing to the atmosphere. A monolithic gas displacement body through which the terminal pillars are fed is disposed in the space between the inside surface of the lid and the electrolyte surface. The purpose of the displacement body is to limit the free volume in which an ignitable gas which is formed from the electrolyte can accumulate under certain conditions. The introduction of the displacement body, which is made of an elastic material, is very complicated in terms of production engineering and, furthermore, the elastic material is only compressible to a limited extent in the event of an explosion of the ignitable gas.

An object of the present invention is to provide design an electrochemical storage device which is more advantageous to produce in terms of production engineering and, furthermore, guarantees a better absorption of the pressure waves in the event of an explosion of the ignitable gas.

The foregoing object has been achieved according to the present invention with an electrochemical storage device in which the displacement body is a thin-walled hollow construction to hermetically enclose the cavity it contains. Since the displacement body is formed as a separate, shape-adapted and hermetically closed cavity, the ignitable gas only has a limited volume available. Upon ignition of the gas, the displacement body is able to burst or to be compressed more easily and in larger regions. The volumetric work required for this purpose is drawn from the explosion of the gas. This ensures that, in the case of electrochemical storage devices having, in particular, a plastic housing, the risk of bursting and, consequently, an escape of the electrolyte outside the housing are avoided. Furthermore, production of the device is more advantageous since the displacement body only has t be inserted before welding.

BRIEF DESCRIPTION OF THE DRAWING

These and other objects, features and advantages of the present invention will become more apparent from the following detailed description of a currently preferred embodiment when taken in conjunction with the accompanying sole drawing which is a cross-sectional elevational view of an electrochemical storage device of the present invention for a conventional lead storage battery containing sulfuric acid electrolyte battery is used in motor vehicles.

DETAILED DESCRIPTION OF THE DRAWING

Referring now to the figure, the electrochemical storage device designated generally by the numeral 1 comprises a housing constituted by a plastic tank 4 and a plastic lid 3 welded thereto in a sealed manner. The housing is of flat wide construction at its upper side 5 and at its lower side 6, thereby making a flush, space-saving stacking of batteries 1 on top of one another possible. In such batteries 1, the risk of bursting due to an explosion is increased for two reasons. On one hand, on overcharging, the electrolyte forms the detonating gas mixture of hydrogen and oxygen which can be ignited within wide limits, and, on the other hand, the cavity situated between the electrolyte surface 2 and the lid 3 is very large, with the result that a large volume of the detonating gas can accumulate. Disposed in this cavity is the shape-adapted displacement body 8 which is provided with a hermetically closed cavity 9. The terminal pillars 7, which are connected to the current collection lugs 11 and which terminate on the outside below the upper side 5 of the housing, are passed through the displacement body 8. The wall of the displacement body 8 is expediently less than two millimeters so that the latter is more readily compressible. The wall, which is advantageously provided with predetermined rupture points in order to increase the burst probability in the event of an explosion of the detonating gas still further, is made of a brittle and consequently readily breakable material. The cavity 9 of the displacement body 8 is advantageously filled either with an inert gas, in particular with nitrogen, or at least slightly evacuated. With these arrangements, the energy will be removed from the pressure wave in the event of an explosion of the detonating gas since volumetric work has to be performed by the gas in the volume of the cavity 9.

Against the background of producing the battery 1, we have found that it is advantageous to make the shape-adapted displacement body 8 out of at least two half shells which are joined to one another in a hermetically sealed manner along a joint line 14 and to attach it to the lid 3. As a result, when the housing is assembled, the displacement body 8 is simply introduced into the tank 4 together with the lid 3. The displacement body 8, which is disposed above the electrolyte surface 2 should be made of electrically insulating material so that in unfavorable cases it does not bring about a short circuit between the individual electrode plates of the battery 1. For this purpose, a spacer 10 made of insulating material is expediently built onto the displacement body 8 and can additionally be disposed between the electrode plates and the displacement body 8. Here it is advantageous to construct the spacer 10 at the same time as a jacket and insulation for the current collection lugs 11 of the electrode plates so that location of the lid 3 on joining the lid 3 to the tank 4 is also improved.

The cavity 9 furthermore has an opening which extends between the lid 3 and the electrolyte surface 2 and in which there is disposed a labyrinth-type pressure equalization connection 13 which is built into the lid 3 and which ensures a pressure equalization between the gas-filled internal space of the housing and the atmosphere. The pressure equalization connection 13 is necessary since, in the case of plastic housings, the risk of bursting exists to a greater extent than is the case with metal housings. In the event of any ignition of the detonating gas, this pressure equalization is, however, unsuitable as a burst protection.

A viewing window 12 can also be disposed in the lid as a transparent component so that the displacement body 8 can be observed from the outside. In interaction with a colored displacement body 8, bursting of the displacement body 8 as a consequence of an explosion is readily detectable and the battery can be replaced. Instead of, or even together with, a colored displacement body 8, small paint bags 15 which burst in the event of destruction of the displacement body 8 and color the inside of the lid 3 can also be disposed inside the displacement body 8.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An electrochemical storage device, comprising an electrolyte which can form an ignitable gas under certain conditions during use, a housing having a tank and a lid joined together with the tank in a liquid-tight manner and in which terminal pillars pass in a sealed manner through the lid at a top of the housing, a labyrinth pressure equalization connection built into the lid to connect to atmosphere a space situated above the electrolyte and enclosed by the housing and a gas displacement body disposed between the electrolyte surface and the lid and substantially filling the space, wherein the displacement body is an electrically insulating material, and has a wall with a thickness of less then 2 mm with a plurality of rupture points disposed throughout the wall and hollow construction enclosing a cavity so that the wall is brittle and readily breakable at the rupture points to allow the cavity contained thereby to absorb the energy of a pressure wave in the event of an explosion.

2. The electrochemical storage device according to claim 1, wherein the electrochemical storage device is a lead storage battery containing dilute sulfuric acid as the electrolyte.

3. The electrochemical storage device according to claim 1, wherein the displacement body is mounted within the lid and is held by the lid above the electrolyte surface.

4. The electrochemical storage device according to claim 1, wherein the displacement body is filled with an inert gas.

5. The electrochemical storage device according to claim 1, wherein the cavity of the displacement body is at lower then atmospheric pressure.

6. The electrochemical storage device according to claim 1, wherein a portion of the housing lid is transparent, and the wall of the displacement body has a dark color.

7. The electrochemical storage device according to claim 1, wherein small paint bags are operatively mounted inside the displacement body.

8. The electrochemical storage device according to claim 1, wherein a spacer made of electrically insulating material is disposed between the displacement body and an electrode plate stack of the electrochemical storage device.

9. The electrochemical storage device according to claim 8, wherein the spacer is built onto the displacement body.

10. The electrochemical storage according to claim 1, wherein the housing is plastic.

* * * * *